United States Patent [19]

Sanford

[11] Patent Number: 5,027,970
[45] Date of Patent: Jul. 2, 1991

[54] GASKETED HATCH COVER

[75] Inventor: Paul E. Sanford, Meadowbrook, Pa.

[73] Assignee: Warminster Fiberglass Company, Southampton, Pa.

[21] Appl. No.: 435,350

[22] Filed: Nov. 13, 1989

[51] Int. Cl.⁵ .............................................. B65D 53/00
[52] U.S. Cl. ................................................... 220/344
[58] Field of Search ............... 220/232, 344, 358, 378

[56] References Cited

U.S. PATENT DOCUMENTS 2,324,333  7/1943  Stoddard ............................. 220/344
2,549,128  4/1951  Pfeiffer ............................. 220/344 X Primary Examiner—Stephen Marcus
Assistant Examiner—Nova Stucker
Attorney, Agent, or Firm—Michael Ebert

[57] ABSTRACT

A gasketed hatch cover usable in an odor control system in a wastewater treatment plant or in other installations provided with a hatch opening which when closed by the cover is then sealed to prevent the escape of fumes into the atmosphere. The hatch opening is bordered by parallel side walls each having a ledge projecting therefrom. The cover is formed by a rectangular plate whose long edges are turned down to form rims that rest on the ledges and are spaced from the side walls of the opening when the cover is closed. Fitting on each rim is a replaceable gasket of compressible material having a J-shaped section defining a channel to snugly accommodate the rim between the parallel short and long legs of the J, and a D-shaped section whose straight leg is common with the long leg of the J-section. When the gasketed cover is closed, the D-shaped section of each gasket is then compressed within the space between the rim and the side wall, thereby sealing the opening.

7 Claims, 1 Drawing Sheet

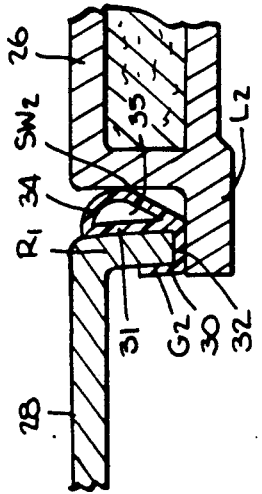
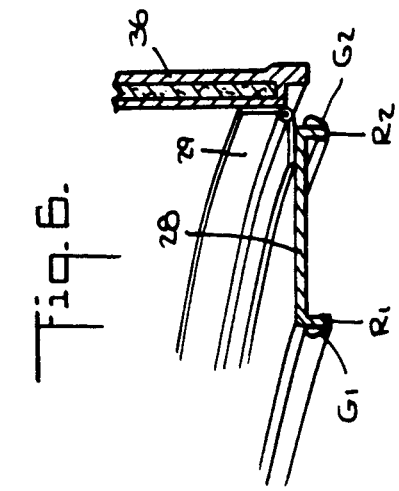
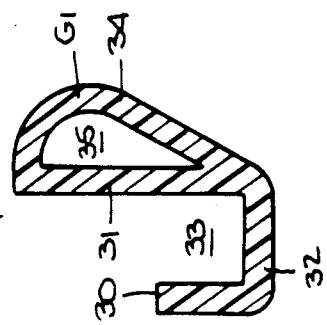
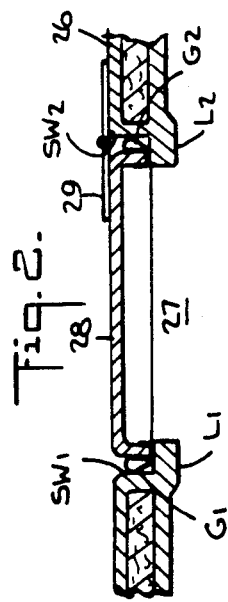
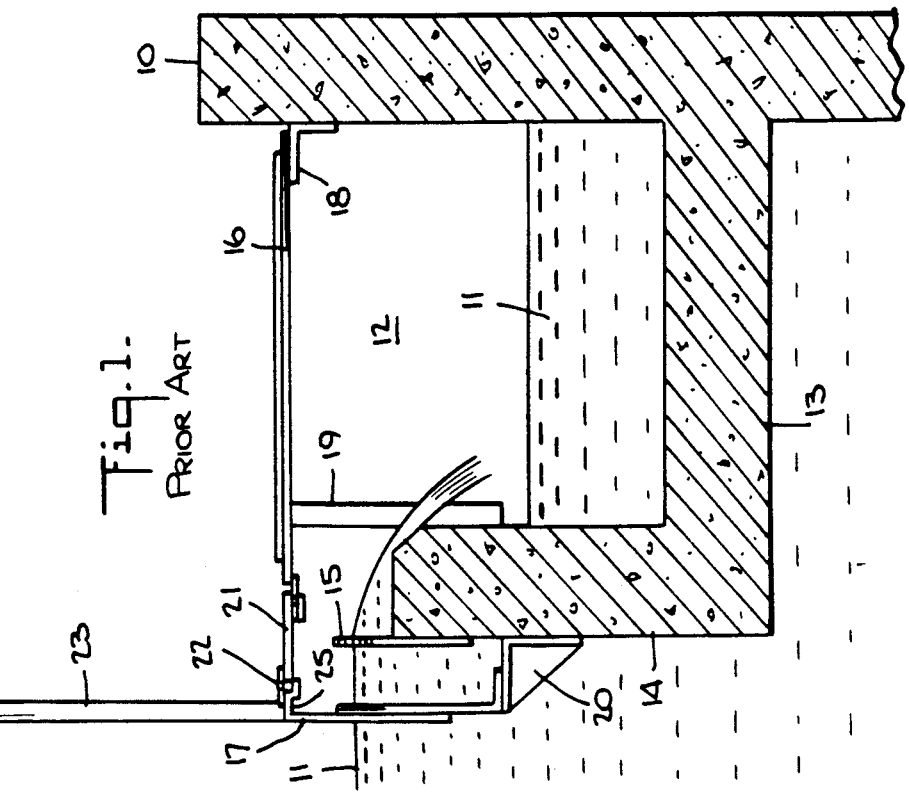

5,027,970

GASKETED HATCH COVER

BACKGROUND OF INVENTION

1. Field of Invention

This invention relates generally to hatch covers, and more particularly to a gasketed hatch cover for use in an odor control system or other installation having a hatch opening which when closed by the gasketed cover is then sealed to prevent the escape of fumes.

2. Status of Prior Art

A gasketed hatch cover in accordance with the invention is applicable to any installation in which there is a hatch opening from which fumes emanate, the hatch cover when closed serving to seal the opening to prevent the escape of the fumes into the atmosphere. While the invention will be specifically described in connection with a wastewater treatment plant provided with odor control means, it is to be understood that the invention is by no means limited to this particular application.

Systems for treating sewage and industrial wastes typically include preliminary settling tanks that collect a good part of the suspended load of impurities before the clarified effluent is discharged into the receiving waters or is subjected to further treatment in secondary settling tanks.

A settling tank has four functional zones; namely, an inlet zone, a settling zone, a sludge zone and an outlet zone. For high efficiency, inlets must distribute flow and suspend matter as uniformly as possible within the tank. In the sludge zone, sludge is worked into a sump from which it is withdrawn by gravity or by a pumping action. In the outlet zone, the control of outflow is usually effected by a weir attached to one or both sides of an outlet trough or launder which acts as a lateral spillway.

The Anderson U.S. Pat. No. 4,391,704, discloses an outlet zone whose structure and operation is such as to minimize the emission of odoriferous and noxious fumes into the atmosphere. Because incoming waste is saturated with noxious gases and easily volatilized compounds, some degree of odor control is generally necessary in a liquid waste treatment system. In sewage, the objectionable compound which predominates is hydrogen sulfide, a colorless gas having an offensive odor. This gas is highly toxic and a strong irritant to eyes and mucous membranes. Hydrogen sulfide is almost always present in sewage, for it is the product of anaerobic decomposition by bacteria present in the sewage and in the sewage treatment system.

The Anderson invention is based on the recognition that almost all the noxious gases generated in a settling tank are released as the clarified water spills over the weirs mounted on the sides of the trough; hence by capturing these hazardous gases in the trough region and transporting the captured gases to a gas-control system or in otherwise disposing of the gases, one is able to reduce the discharge of gases into the atmosphere to an acceptably safe level.

The Anderson patent provides an outlet zone for a settling tank in which the trough is covered by a hood that also functions as a scum baffle. In a conventional outlet zone, a baffle which protrudes into the tank water is mounted adjacent to the weir of the trough to prevent grease and other floating matter from being discharged into the trough with the effluent. With the Anderson arrangement there is no need for separate baffle plates; for the hood which acts to confine the gases released in the trough has a baffle integral therewith.

Inasmuch as the hood in Anderson which covers the trough is required to collect a relatively small volume of air as compared to a cover placed over the tank, a significant advantage of this arrangement is that it is not only more effective than a massive tank cover, but is also substantially less expensive to construct and operate.

The arrangement disclosed in the Anderson patent represents a significant contribution to the art of wastewater treatment, yet it has certain practical drawbacks. In Anderson, the weir which permits clarified tank water to spill into the trough lies under the gas-confining hood, at least one side of the hood protruding into the water to function as a scum baffle. After prolonged operation, the weir accumulates algae, sludge and other contaminants, and these interfere with the proper operation of the weir. Hence it becomes necessary, on occasion, to remove the entire hood from the trough in order to gain access to the weir so that it can be scrubbed and cleaned, after which the hood must be placed back on the trough. This is a somewhat difficult, costly and time consuming operation.

And if one wishes only to decontaminate the side of the hood which acts as a scum baffle in order to remove scum build-up without, however, removing the hood from the trough, this operation also presents difficulties. The hood in Anderson is molded of fiberglass-reinforced plastic and has a quasi-convex top surface. This rounded surface is not an easy or safe surface for an operator to walk over, either to obtain access to the scum baffle or to inspect the installation.

The prior 1988 (Roley U.S. Pat. No. 4,767,536) is directed to an improvement over the Anderson arrangement in that access to the weir is obtained without the need to remove the hood which serve to confine and capture noxious gases emitted from the trough. Thus, cleaning of the weir presents no practical difficulties.

The prior Roley patent provides an outlet which includes a walkway that overlies the trough and the weir and serves to confine noxious gases emitted into the region above the trough and weir. This walkway makes it possible for an operator to gain access to a scum baffle so that it can be cleaned or for the operator to inspect the installation, the walkway being provided with a safety hand rail. The walkway includes a hatch cover section affording access to the weir when it becomes necessary to scrub and clean the weir.

It is important when the hatch cover is closed that no fumes are then permitted to escape from the outlet zone to the atmosphere, for these fumes, even in low concentrations in the atmosphere having a disagreeable smell and are noxious. With a conventional hinged hatch cover as in the prior Roley patent, though the cover fits neatly over the hatch opening, it is not sealed along the edges and some gas leakage will occur.

SUMMARY OF INVENTION

In view of the foregoing, the main object of this invention is to provide a gasketed hatch cover usable in an odor control system in a wastewater treatment plant or in other installations having a hatch opening which when closed by the cover is then sealed to prevent the escape of fumes into the atmosphere.

More particularly, an object of this invention is to provide a gasketed cover having a replacement gasket that can be readily applied to the cover without the use of tools for this purpose, and which can just as easily be removed and replaced when replacement is necessary.

While neoprene and other compressible materials usable for gaskets are resistant to chemical attack, the high corrosive nature of the fumes emanating from a sewage treatment plant are such that gaskets have a limited life. A significant advantage of the invention is that the gaskets can be readily removed from the cover and replaced.

Yet another object of the invention is to provide a gasketed hatch cover that can be manufactured at relatively low cost and which operates efficiently and reliably.

Briefly stated, these objects are attained in a gasketed hatch cover usable in an odor control system in a wastewater treatment plant or in other installations having a hatch opening which when closed by the cover is then sealed to prevent the escape of fumes into the atmosphere. The hatch opening is bordered by parallel side walls each having a ledge projecting therefrom.

The cover is formed by a rectangular plate whose long edges are turned down to form rims that rest on the ledges and are spaced from the side walls of the opening when the cover is closed. Fitting on each rim is a replaceable gasket of compressible material having a J-shaped section defining a channel to snugly accommodate the rim between the parallel short and long legs of the J, and a D-shaped section whose straight leg is common with the long leg of the J-section. When the gasketed cover is closed, the D-shaped section of each gasket is then compressed within the space between the rear and the side wall, thereby sealing the opening.

BRIEF DESCRIPTION OF DRAWINGS

For a better understanding of the invention as well as other objects and further features thereof, reference is made to the following detailed description to be read in conjunction with the accompanying drawings, wherein:

FIG. 1 is a sectional view of a prior art gas extraction outlet for a wastewater tank, the outlet including a hatch cover;

FIG. 2 is a transverse section taken through a gasketed hatch cover in accordance with the invention;

FIG. 3 is a transverse section taken through the cover with the gaskets removed;

FIG. 4 is a transverse section taken through a gasket in accordance with the invention;

FIG. 5 is a partial view, in section, of the gasketed cover and of the hatch opening, this view illustrating the manner in which the cover effects a fluid-tight seal; and FIG. 6 is a perspective view of the hatch cover in an installation in which it is hinged from a safety guard rail.

PRIOR ART HATCH COVER

Since a gasketed cover in accordance with the invention and the manner in which it functions can best be understood in the context of a gas-extraction outlet for a settling tank of the type described in my above-identified prior patent (Roley), above-identified, a brief description of this outlet will now be given in connection with FIG. 1.

This gas-extraction outlet for a settling tank includes an outer wall 10 formed of concrete or other suitable structural material capable of containing a pool 11 of wastewater to be clarified. The tank may be in circular form, in which case the wall is circular, or it may be in rectangular form, in which case the wall is straight.

Supported at a raised position in the pool against the inner surface of tank wall 10 is an effluent trough 12. Trough 12, which is also formed of concrete, is so cast that it is integrated with tank wall 10. Trough 12 is defined by a bottom wall 13 and a side wall 14 parallel to tank wall 10. The height of side wall 14 is such that this wall is somewhat below the surface of the wastewater pool 11, the water in the surface region being clarified.

Supported against the outer face of side wall 14 of the trough is a weir 15 which has a sawtooth upper edge which extends just above the surface of pool 11. Weir 15 permits clarified water from the surface region in pool 11 to spill over into effluent trough 12. The upper edge of side wall 14 is chamfered to cause the inflowing water to spill downwardly into the trough.

Because the noxious gases emanate largely from the effluent trough, no need exists to cover the entire tank in order to capture these gases, for by covering only the trough and the weir inlet thereto, one can capture substantially all of the gases. To this end, there is provided a flat walk plate 16 which overlies effluent trough 12 and weir 15. Walk plate 16 extends horizontally from the inner surface of tank wall 10 to a right angle flange 25 joined to a vertical baffle 17 extending downwardly into pool 11. Walk plate 16 and baffle 17 together act as a hood to confine the atmospheric region above the trough and the weir so as to capture the gases emitted from the effluent.

Walk plate 16 is secured to tank wall 10 by an angle 18. A bracket 19 mounted against the inner surface of sidewall 14 of the trough acts to support walk plate 16 at an intermediate point thereon.

Baffle 17, which is placed in advance of weir 15, is supported by an outboard bracket 20 mounted on the outer surface of sidewall 14. Walk plate 16 includes a flat hatch cover section 21 which is hinged to flange 25 by a stainless steel piano hinge 22. Mounted on top of flange 25 is a vertical safety hand rail 23.

Hatch cover section 21 which is coplanar with walk plate 16 is normally a part of the walkway which is preferably provided with a non-skid tread. Hence an operator who wishes to inspect the system can walk safely thereover and hold onto hand rail 23. But should it become necessary to obtain access to weir 30 to scrub and clean the weir, one has merely to swing up hinged hatch cover 21 to do so.

The interior region overlying trough 12 and the inlet thereto which includes weir 15 is enclosed by walk plate 16 and baffle plate 17 to capture the emitted noxious gases. These can be exhausted from this region by a suction pump coupled to a gas control system or by other means in the manner described in the Anderson and Roley patents.

THE NEW GASKETED HATCH COVER

Referring now to FIG. 2, there is shown a gasketed hatch cover in accordance with the invention-adapted to cover a hatch opening which when uncovered releases noxious fumes into the atmosphere. Since this opening affords access to a weir and scum baffle and therefore has the same function as the hatch opening in FIG. 1, it is necessary to provide a hatch cover that can be raised to provide such access, yet when closed will effect a fluid-tight seal to prevent the escape of fumes into the atmosphere.

In practice, the hatch cover is raised infrequently in order to clean the weir and scum baffle. Hence under normal operating circumstances no fumes are permitted to escape.

As shown in FIG. 2, walkway 26 corresponding to walkway 16 in FIG. 1 is provided, walkway 26 having a hatch opening 27 therein. Opening 27 is bordered by sidewalls $SW_1$ and $SW_2$ which are at right angles to walkway 26. Projecting inwardly from these sidewalls are ledges $L_1$ and $L_2$ to define a socket for accommodating the hatch cover so that its upper surface is co-planar with that of the walkway, and the walkway is therefore free of protrusions that may trip an operator.

The hatch cover, as best seen in FIG. 3, is formed by a rectangular plate 28 of stainless steel, galvanized iron or other metal impervious to the fumes. The long edges of plate 28 are bent down to form rims $R_1$ and $R_2$ at right angles to the plane of the plate. Cover 28 is hingedly connected to walkway 26 by a suitable hinge 29.

Fitting onto rims $R_1$ and $R_2$ of hatch cover 28 are gaskets $G_1$ and $G_2$ formed of neoprene or other resilient, compressible material resistant to attack by the fumes emanating from the hatch opening. As best seen in FIG. 4, each gasket includes a J-shaped section defined by parallel short and long legs 30 and 31 and a bottom leg 32 at right angles thereto to form a channel 33. The width of channel 33 relative to the thickness of the cover rims is such that the channel snugly accommodates the related rim. The attachment of the gasket to the rim or its removal therefrom requires no tools and can be carried out without difficulty when it is necessary to replace a worn or corroded gasket.

The gasket is further provided with a D-shaped section whose straight leg is common with long leg 31 of the J-shaped section, so that the sections are integral with each other. The convex leg 34 of the D-shaped section defines a cavity 35 with straight leg 31. In practice, the gasket may be formed by extruding neoprene or similar material.

The arrangement is such that, as shown in FIG. 5, when cover 28 is closed so that its rims $R_1$ and $R_2$ then rest on ledges $L_1$ and $L_2$ and are cushioned thereon by resilient base leg 32 of the gaskets, the D-shaped section is then compressed in the space between the rims of the cover and sidewalls $SW_1$ and $SW_2$ of the hatch opening. Such compression deforms the convex leg 34 of the D-shaped section, which is free to deform by reason of cavity 35, the convex leg in seeking to resume its normal shape, pressing against the side wall.

Hence the gasket affords a double seal between the rim of the hatch cover and the side wall bordering the hatch opening. The first seal is effected by base leg 32 of the gasket which blocks the flow of gas between the rim and the ledge on which it rests. However, should the rim not be firmly seated on the ledge and some gas leakage then occurs, the D-shaped section will block any gas flow into the atmosphere.

FIG. 6 shows the gasketed hatch cover hinged to a vertical guard rail 36 so that when the cover is raised, it rests against the guard rail. In practice, the hatch cover may be provided with acrylic windows so that one can observe the region below the cover.

While there has been shown and described a preferred embodiment of a gasketed hatch cover in accordance with the invention, it will be appreciated that many changes and modifications may be made therein, without, however, departing from the essential spirit thereof.

I claim:

1. A gasketed hatch cover adapted to close and seal a hatch opening bordered by parallel side walls each having a ledge projecting therefrom to form a socket for receiving the hatch cover, said opening when uncovered admitting fumes into the atmosphere, said cover comprising:
   (a) a rectangular plate whose long edges are bent down to form a pair of parallel rims which when the cover is closed rests on the ledges; and
   (b) a gasket for each rim formed of compressible material having a channel therein to snugly accommodate the rim, said gasket having a base portion and a side portion whereby when the cover is closed, the base portion is compressed against the ledge and the side portion is compressed against the related side wall to provide a double seal that prevents the escape of fumes into the atmosphere at the long edges of the hatch cover.

2. A hatch cover as set forth in claim 1, wherein said hatch opening is formed in a flat walkway and said plate when the cover is closed is co-planar with the surface of the walkway.

3. A hatch cover as set forth in claim 2, wherein said plate is hinged to the walkway.

4. A hatch cover as set forth in claim 1, wherein said plate is made of stainless steel.

5. A hatch cover as set forth in claim 1, wherein said gasket includes a J-shaped section having parallel short and long legs and a base leg at right angles thereto to define said channel, said base leg constituting said base portion of the gasket.

6. A match cover as set forth in claim 5, wherein said gasket further includes a D-shaped section having a straight leg common to said long leg, and a convex leg defining with the straight leg a cavity, said D-shaped section constituting the side portion of the gasket and being compressed when the cover is closed between the rim and the side wall.

7. A hatch cover as set forth in claim 6, wherein said gasket is formed of extruded neoprene.

* * * * *